United States Patent [19]

Kirby

[11] Patent Number: 4,744,340
[45] Date of Patent: May 17, 1988

[54] VORTEX GENERATOR INTAKE VALVE AND SYSTEM OF USING THE SAME

[76] Inventor: Ronald A. Kirby, 97 Miller La., Ft. Thomas, Ky. 41075

[21] Appl. No.: 877,118

[22] Filed: Jun. 23, 1986

Related U.S. Application Data

[63] Continuation-in-part of Ser. No. 755,903, Jul. 17, 1985, abandoned.

[51] Int. Cl.$^4$ .................................................. F01L 3/06
[52] U.S. Cl. .......................... 123/188 VA; 123/188 M; 123/306
[58] Field of Search ........... 123/306, 188 M, 188 VA, 123/590, 592

[56] References Cited

U.S. PATENT DOCUMENTS

| | | | |
|---|---|---|---|
| 958,759 | 5/1910 | Nilson | 123/188 VA |
| 1,418,911 | 6/1922 | Garlick | 123/188 VA |
| 1,539,167 | 5/1925 | Diel et al. | 123/188 VA |
| 2,111,549 | 3/1938 | Blanchet | 123/188 VA |
| 2,740,392 | 4/1956 | Hollingsworth | 123/592 |
| 2,988,080 | 6/1961 | Rankl | 123/188 VA |
| 3,090,370 | 5/1963 | Kimball | 123/188 VA |
| 4,187,823 | 2/1980 | Brown, Jr. | 123/188 M |
| 4,309,969 | 1/1982 | Matthes | 123/188 M |
| 4,424,777 | 1/1984 | Klomp | 123/306 |
| 4,432,312 | 2/1984 | Klomp et al. | 123/188 VA |

FOREIGN PATENT DOCUMENTS 2041443 9/1980 United Kingdom ................ 123/306

*Primary Examiner*—Ira S. Lazarus
*Attorney, Agent, or Firm*—Frost & Jacobs

[57] ABSTRACT

An intake valve for use in an internal combustion engine has a plurality of impellers rigidly attached to its inlet side and oriented to optimize the vaporization and homogenity of fuel within the combustion chamber. The impellers harness the fuel/air mixture and create overlapping airflow vortexes within the combustion chamber.

5 Claims, 3 Drawing Sheets

VORTEX GENERATOR INTAKE VALVE AND SYSTEM OF USING THE SAME

CROSS REFERENCE TO RELATED APPLICATION

This is a continuation-in-part of application Ser. No. 06/755,903, filed July 17, 1985, now abandoned.

FIELD OF THE INVENTION

The present invention relates to a fuel intake system for a reciprocating internal combustion engine. More particularly, the invention relates to an intake valve design which cooperates with the intake manifold and port configuration of most internal combustion engines and is able to improve the fuel vaporization within the combustion chamber.

BACKGROUND OF THE INVENTION

Standard internal combustion engines rely upon a pressure differential to move the fuel/air mixture into the combustion chamber. During the intake stroke of a conventional engine, the piston recedes in the cylinder bore, away from the fuel/air inlet port. Simultaneously, a valve is opened at the inlet port. The receding piston creates a partial vacuum in the combustion chamber, causing a pressure differential to develop between the combustion chamber and the outside atmosphere. As a result, air is drawn through the carburetor, through the intake manifold, past the intake valve and into the combustion chamber. As the air passes through the carburetor, fuel is mixed with the air to create a misty fuel/air mixture. It is this fuel/air mixture which is drawn into the combustion chamber and is ignited to provide energy.

The nature and quality of the combustion of the fuel/air mixture in the combustion chamber depends upon numerous factors. One of the most significant of these factors is the degree to which the fuel droplets released by the carburetor are atomized and eventually vaporized on their way to the combustion chamber. Ideally, the fuel/air mixture in the combustion chamber should be a gas consisting of a combination of air fuel in the gaseous state. Fuel in the liquid state, suspended in the combustion chamber as a mist or droplets, will not ignite and yield the resulting thermal energy as effectively as totally vaporized, gaseous fuel.

The power generating capability of a given size combustion chamber also depends upon a number of factors. Among the most important of these factors is the quantity of the fuel/air mixture present in the combustion chamber at the end of the intake cycle. Injection of a large amount of fuel/air mixture into the combustion chamber results in an increase in the power output of the chamber. However, in a conventional engine, the need to maximize that quantity and the need to maximize fuel vaporization within the combustion chamber poses a problem. Designs meant to improve vaporization often inhibit the free flow of fuel/air mixture into the combustion chamber.

Various intake system designs have been proposed which are intended, among other things, to improve the vaporization of the fuel. These designs generally either provide a needlessly complicated apparatus or neglect to consider the impact that the design will have on the quantity of fuel/air mixture reaching the combustion chamber by the end of the intake stroke.

U.S. Pat. No. 958,759, issued to Nilson in 1910, discloses a poppet valve for a combustion engine. The valve includes a stem mounted to a thin curved head. A plurality of curved ribs extend from the stem to a flange on the valve head. The valve construction disclosed by Nilson is designed to increase the strength of a valve and at the same time reduce the weight of the valve. The curved ribs provide a greater radiating surface to prevent overheating of a valve. However, the flange of the valve head and the ribs inhibit the free flow of the fuel/air mixture into a combustion chamber. As the fuel/air mixture is drawn into a combustion chamber, the ribs and flange impede the velocity of the mixture and reduce vaporization.

Another poppet valve for an internal combustion engine is disclosed in British Pat. No. 2041443A published in 1980. The valve includes a plurality of helical vanes extending away from the stem. The vanes project upwardly from the valve head and are designed to create a swirling flow of the fuel/air mixture in a combustion chamber. However, the height of each vane impedes the velocity of the mixture as it passes over the valve head, thereby reducing vaporization.

It is, therefore, an object of the present invention to improve vaporization of the fuel/air mixture in the combustion chamber without reducing the flow of the fuel/air mixture to the chamber. A related object is the improvement of the distribution of vaporized fuel within the combustion chamber. A further object is to provide a swirling motion to the fuel/air cloud in the chamber. These effects of the present invention provide improved fuel efficiency and reduced emissions without a power loss resulting from inhibited flow of the fuel/air mixture to the combustion chamber.

SUMMARY OF THE INVENTION

In accordance with the invention, there is provided a vortex generator intake valve comprised of a valve stem, a valve head and a plurality of impellers attached to the stem and head and to the radius at which the stem and head meet. The impellers are so arranged, shaped, pitched and angled on the valve that the rush of air and vaporous fuel past the impellers diverts the liquid fuel particles of the fuel/air mixture and discharges those particles into the combustion chamber. Additionally, the impellers cause the rushing air, which contains the suspended fuel particles, to spiral and create vortexes at the impeller tips. These vortexes appear at each impeller tip. They cause dispersion of the liquid fuel particles and cause turbulence within the combustion chamber in such a manner as to promote improved fuel vaporization, improved flame propagation, decreased fuel consumption and reduced exhaust emissions in the combustion process.

DESCRIPTION OF THE DRAWINGS

Other objects and advantages of the invention will become apparent upon reading the following detailed description and upon reference to the drawings in which.

DETAILED DESCRIPTION OF THE INVENTION

While the invention described below is in connection with a preferred embodiment, it is not intended to limit the invention to that embodiment. On the contrary, it is intended to cover all alternatives, modifications and equivalants as may be included within the spirit and scope of the invention as defined by the claims below.

Figure 1:
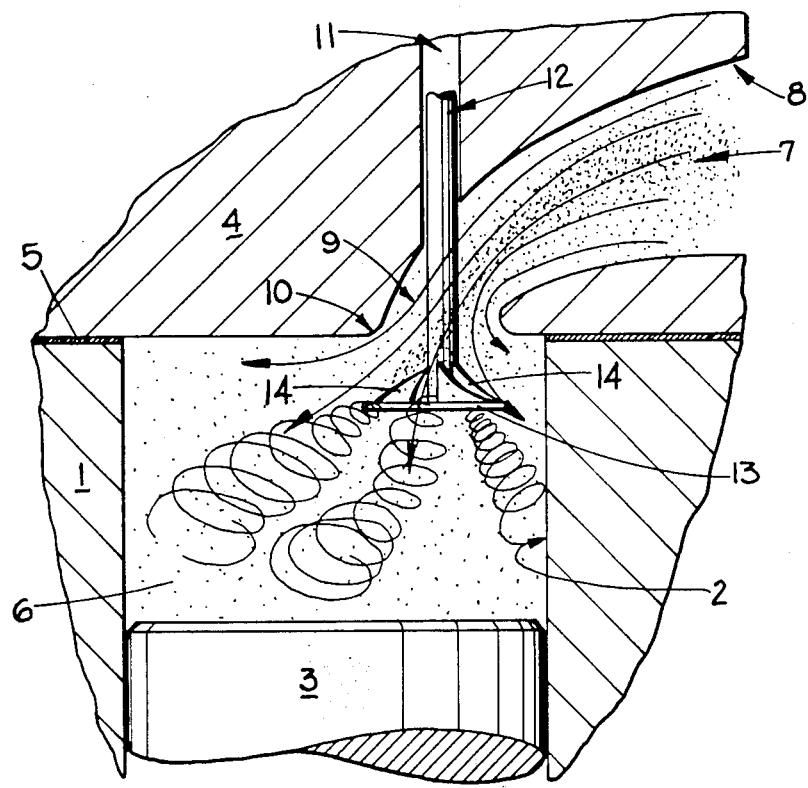
FIG. 1 is a cross-sectional view of a portion of an internal combustion engine embodying the invention and showing the vortex generator valve adjacent portions of the associated cylinder and piston, the valve and piston being shown in elevation.

Turning first to FIG. 1, there is illustrated a portion of an internal combustion engine having an engine block 1 with at least one cylinder 2 defined by an internal cylindrical bore wall formed in the cylinder block 1. Within cylinder 2 there is situated a piston 3. The top of the cylinder is closed by a cylinder head 4 that is suitably secured to the cylinder block 1. A typical gasket 5 is sandwiched between the cylinder head and the cylinder block 1. The cylinder 2, piston 3 and cylinder head 4 cooperate to define a variable volume combustion chamber 6.

The cylinder head 4 is provided with an intake passage 7 which has an entrance end 8 at its upstream end which is adapted to receive an inlet manifold (not shown). The inlet passage 7 terminates at its opposite end at an intake port 9 which opens into the combustion chamber 6. Intake port 9 terminates at an annular valve seat 10 which typically is chamfered or beveled at a suitable angle to the axis of the intake port. A valve guide bore 11 is formed in cylinder head 4 to carry the valve 12 of the present invention, described more fully below.

For convenience of illustration, the exhaust valve and exhaust port found on a typical internal combustion engine are not included in FIG. 1. Additionally, the piston 3 is shown having a flat head and the axis of valve 12 is shown as being parallel to the axis of combustion chamber 6. Variations on these arrangements are possible and are included within the scope of this invention.

The portion of an internal combustion engine illustrated in FIG. 1 operates in the following manner to supply fuel to combustion chamber 6. Piston 3 moves downward in cylinder 2. At the same time valve 12 is moved downward a fixed distance by a mechanism not illustrated in FIG. 1. The downward movement of piston 3 creates a partial vacuum in combustion chamber 6 which draws the fuel/air mixture through inlet passage 7 and over inlet valve 12 to fill the combustion chamber 6. When piston 3 reaches the farthest downward position, intake valve 12 is moved upward until it contacts valve seat 10 by a mechanism not illustrated.

Piston 3 then moves upward to compress the fuel/air mixture which later is ignited when piston 3 reaches the top of its stroke to force piston 3 downward in cylinder 2. The forcefulness and efficiency of the explosion within the combustion chamber that results when the fuel/air mixture is ignited depends, among other things, upon (a) the homogeneity of the fuel/air mixture within combustion chamber 6 and (b) the extent to which the fuel has been converted to a gaseous state from its original liquid state.

The fuel component of the fuel/air mixture which enters intake passage 7 originates at a carburetor (not shown). The carburetor distributes fuel in the form of tiny droplets into the stream of air drawn into the combustion chamber 6. Engine heat and the vapor pressure of the liquid fuel cause many of the droplets to vaporize before reaching combustion chamber 6. However, many droplets do not fully vaporize. These droplets are carried in the laminar flow of the fuel/air mixture through inlet passage 7. As illustrated in FIG. 1, the heavier liquid droplets typically are concentrated in the center of the inlet passage 7, away from the hotter, slower moving laminar flow regions adjacent the passage walls. This phenomenon, together with the inertia of these liquid droplets, causes them to become concentrated around the inlet valve 12 during their passage through intake port 9.

With a typical inlet valve, the liquid particles are unevenly dispersed or deflected into the combustion chamber 6 by the inlet valve where they remain suspended or undergo further vaporization before ignition. The inlet valve 12 according to the present invention substantially improves vaporization of these fuel droplets and distribution of the fuel/air mixture within combustion chamber 6. As illustrated in FIG. 1, the valve 12 of the present invention harnesses the force of the vaporous fuel/air mixture rushing into the combustion chamber 6. The vaporous fuel/air mixture is diverted by blades or impellers 14 as it passes through the intake port 9 and over the valve head 13. Each impeller 14 generates a vortex at its tip 19 which extends radially away from the longitudinal axis 20 of valve 12. The force of these vortexes broadly disperses the liquid fuel particles within the combustion chamber 6. The vortexes also grow and overlap as they extend radially away from the axis of valve 12. The overlapping effect results in added turbulence within the combustion chamber 6. The force of the vortexes and the added turbulence combine to improve the vaporization of the liquid fuel particles and to improve the homogeneity within the combustion chamber 6 of vaporous fuel concentration. As stated earlier, this greatly improves the efficiency of the combustion process.

Figure 2:
FIG. 2 is a perspective view of a vortex generator valve.
Figure 3:
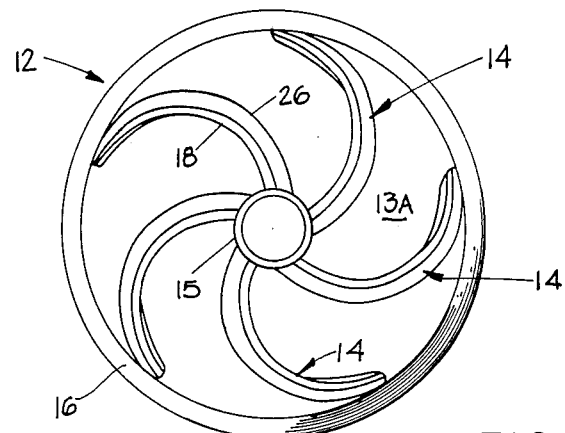
FIG. 3 is a top view of the vortex generator valve of FIG. 2.
Figure 4:
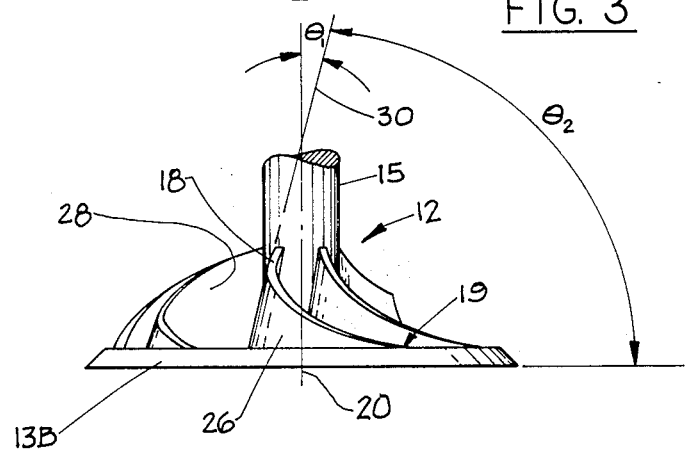
FIG. 4 is a side view of the vortex generator valve of FIG. 2.

FIGS. 2, 3 and 4 provide more detailed views of the vortex generator valve 12 of the present invention. The vortex generator valve 12 consists generally of a valve head 13, a valve stem 15 and a plurality of impellers 14. The valve head 13 is preferably a planar member having a first or upper surface 13A and a second or lower surface 13B. It is further preferred that the periphery of valve head 13 is beveled or chambered or otherwise suitably finished at 16 to closely mate with valve seat 10 shown in FIG. 1. Valve stem 15, preferably of cylindrical cross-section, is rigidly mounted substantially perpendicular on the upper surface 13A of the valve head 13. A radius 17 is formed where the valve stem 15 and valve head 13 meet.

In a preferred embodiment, a plurality of impellers 14 are rigidly attached to valve stem 15 and the upper surface 13A of the valve head 13. In the Figures, five impellers 14 are illustrated; however, other numbers of impellers 14 are within the scope of this invention. Each impeller 14 is a convexo-concave triangular member shaped somewhat like a shell or a pennant. Each impeller 14 includes a side edge 22 rigidly attached to the valve stem 15, a bottom edge 24 rigidly attached to the upper surface 13A of the valve head 13 and a top edge 18. The impellers 14 may be integrally constructed with the valve head 13 and stem 15.

As shown best in FIG. 3, it is preferred that the radius of each impeller 14 be generally constant. It is further preferred that the radius range between approximately one-quarter and approximately one-half of the diameter of the valve head.

FIG. 4 illustrates the angular orientation or pitch of each impeller 14 with respect to the valve stem 15. Each impeller 14 includes an outer convex surface 26 and an inner concave surface 28. It is preferred that a line 30 tangent to the convex surface 26 of each impeller 14 is not parallel to the longitudinal axis of the valve stem 15. Angle $\theta_1$ is measured between tangent 30 and the longitudinal axis 20. It is preferred that $\theta_1$ be in the range from 5° to 25°, but not greater than 45°. Consequently, $\theta_2$, measured between tangent 30 and the plane of the valve head 13, will always be an acute angle and it is preferred that $\theta_2$ not exceed 45°. The angular orientation of each impeller 14 causes fuel/air mixture passing by to form a vortex thereby dispersing fuel particles away from the valve 12 and into the combustion chamber 6 to create a homogenous fuel/air vapor. Such a "gasified" fuel provides clean burning and low residue combustion. Furthermore, a lower combustion chamber temperature and reduced fuel/air ratios eliminate detonation.

The top edge 18 of each impeller 14 slopes downward and merges at its tip 19 into the upper surface 13A of the valve head 13. As the fuel/air mixture passes by the impellers 14, it is not impeded by the height of impeller tips 19. This detail minimizes obstruction to the velocity of the fuel/air mixture as it moves away from an impeller tip 19 and provides excellent vortex generation. Vortex generation results in better vaporization of the fuel/air mixture.

In operation, the valve 12 recedes into the combustion chamber 6 a predetermined distance allowing the air/fuel mixture to flow into the chamber 6. This predetermined distance is commonly known as the valve opening. It is preferred that the height of each impeller 14 along side edge 22 is greater than the valve opening. The tapered impeller tips 19 allow the valve 12 to close and permit the side edge 22 of each impeller 14 to be farther upstream in the intake port 9 than the valve head 13. This feature is important to vortex generation as it minimizes resistance to incoming air/fuel mixture. It is preferred that the height, pitch, curvature, and number of impellers 14 be determined by internal combustion engine requirements.

To be a practical element of a fuel intake system, any device which attempts to improve fuel vaporization and distribution within the combustion chamber 6 must do so without unduly restricting the flow rate of the fuel/air mixture into the combustion chamber. Otherwise, the power loss resulting from reduced flow rate may outweigh any benefits derived from improved vaporization and dispersion of the fuel/air mixture within the combustion chamber. The present valve 12 does not obstruct the fuel/air mixture during the intake stroke.

Figure 5:
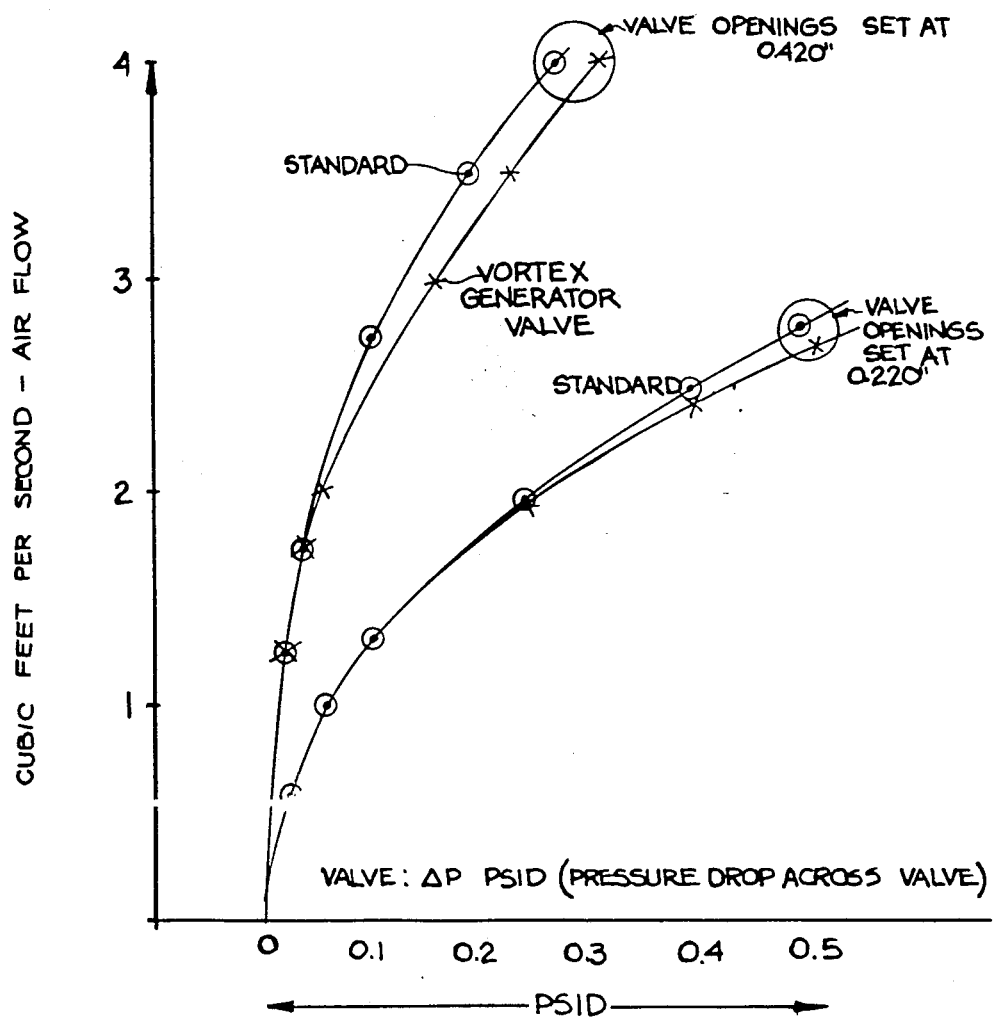
FIG. 5 is a graph which demonstrates the effect on airflow of the present invention.

The experimental results shown in FIG. 5 demonstrate that the present invention has achieved this unique balance between improved vaporization and unobstructed flow of the fuel/air mixture. The graph shown in FIG. 5 presents data gathered by the inventor which illustrates the flow rates of the fuel/air mixture into a 350 cubic inch displacement engine both with a standard valve and with the vortex generator valve of the present invention. The Y-axis represents airflow measured in cubic feet per second and the X-axis represents the pressure differential across the valve measured in pounds per square inch. This graph illustrates the extent to which the vortex generator valve of the present invention affects the resistance to flow of the fuel/air mixture as compared to a "standard" valve. It is apparent from the data points marked on this graph that the increase in pressure differential within the operating range of the engine is slight.

Thus, there is provided, in accordance with the invention, a vortex generator intake valve that fully satisfies the objectives and advantages set forth above. While the invention has been described in conjunction with a specific embodiment, it is evident that many alternatives, modifications, and variations will be apparent to those skilled in the art in light of the foregoing description. Accordingly, it is intended to embrace all such alternatives, modifications and variations as fall within the spirit and broad scope of the claims below.

What is claimed is:

1. An intake valve for use with an internal combustion engine or the like of the type igniting a fuel/air mixture in a combustion chamber of the engine, said valve comprising:
   a. an elongated valve stem;
   b. a generally cylindrical flangeless valve head having spaced apart upper and lower faces, said stem being rigidly attached at one end to said lower valve face, the outer periphery of said head forming a seating surface; and
   c. a plurality of spaced impellers having an upper edge fixedly secured to said lower valve face and extending radially from said stem to the seating surface, each of said impellers comprising a thin arcuate vane-like member curving in a single direction from the stem to the seating surface and tapering decreasingly in height from said stem to the outermost tip of said impellers so as to merge into the lower face of the valve head adjacent said valve seat, the curvature, spacing and height of said impellers being configured so as to divert an incoming fuel/air mixture away from the valve by creating vortices in the combustion chamber of the engine.

2. The intake valve as specified in claim 1 wherein each impeller is inclined so that a line tangent to the convex surface of each impeller forms an acute angle with the plane of the valve head.

3. The intake valve as specified in claim 2 wherein the angle between the line tangent to the convex surface of each impeller and a longitudinal axis of the valve stem is not greater than 45°.

4. The intake valve as specified in claim 1 wherein the radius of each impeller is generally constant.

5. The intake valve as specified in claim 1 wherein the valve head, valve stem and impellers are constructed integrally.

* * * * *